Feb. 22, 1955    P. W. DEWEY    2,702,897
TELEMETERING WET TEST METER
Filed Feb. 28, 1951    2 Sheets-Sheet 1
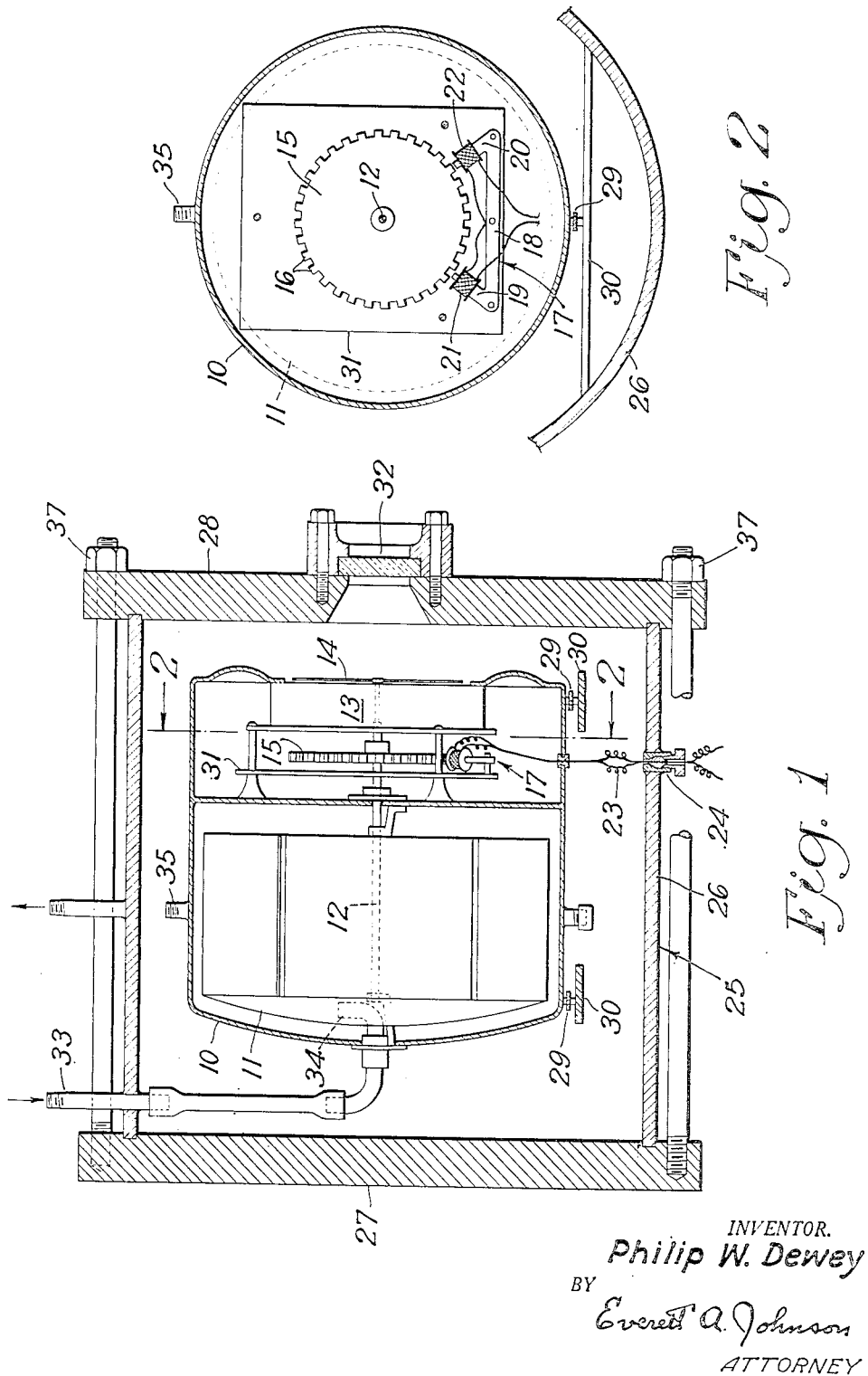
INVENTOR.
Philip W. Dewey
BY
Everett A. Johnson
ATTORNEY

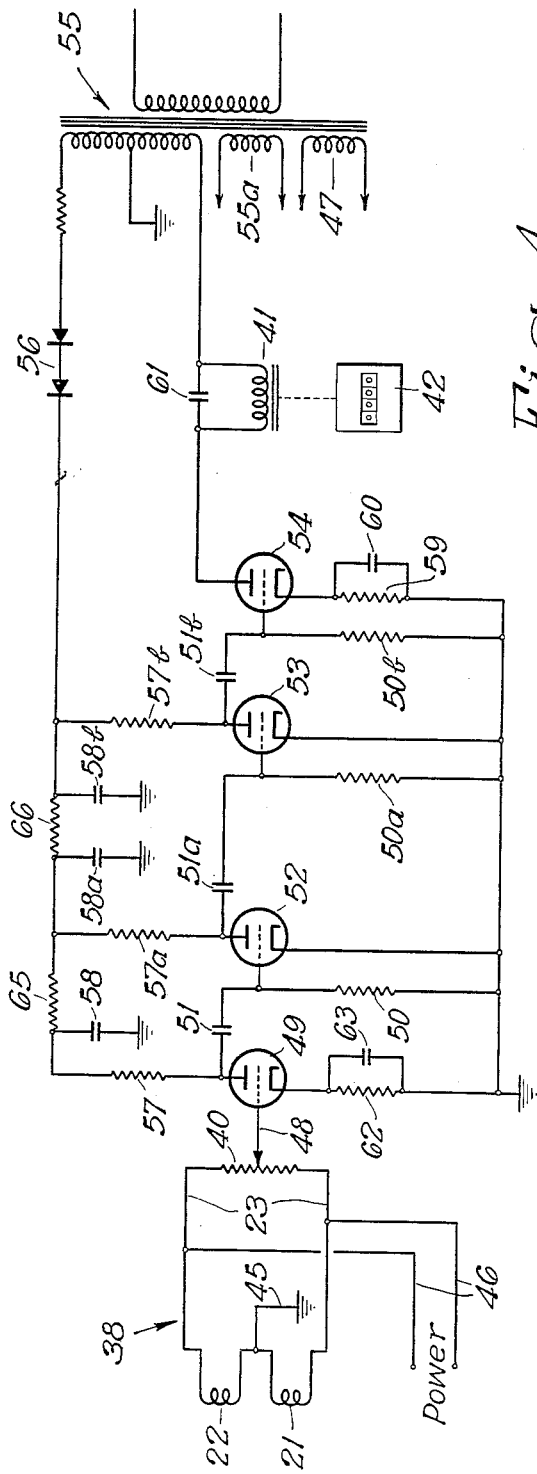
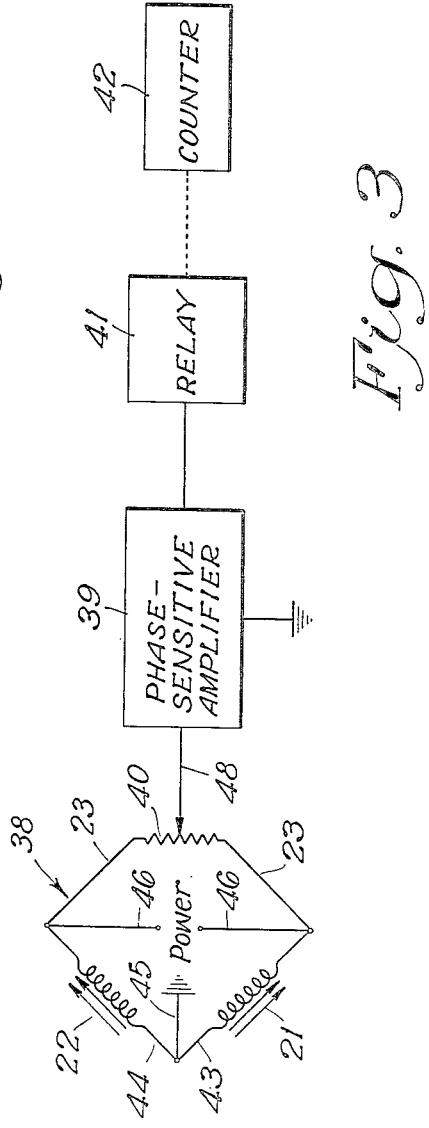

United States Patent Office 2,702,897
Patented Feb. 22, 1955

2,702,897

TELEMETERING WET TEST METER

Philip W. Dewey, Munster, Ind., assignor to Standard Oil Company, Chicago, Ill., a corporation of Indiana Application February 28, 1951, Serial No. 213,197

10 Claims. (Cl. 340—203)

This invention relates to apparatus for indicating at a remote point the rotation of a slowly moving element. More specifically the invention relates to a system for remote metering of such quantities as gas and liquid flows.

Conventional wet test meter readings are made by use of integrating dial pointers attached to integrating gear shafts. Pointer hands may be incorrectly read; gear meshing is none too perfect and inclined to slip, thus giving inaccurate readings. It is therefore an object of the invention to provide an indicating system which is more easily and accurately read than the conventional index dial system used on these meters.

It is frequently necessary to measure and totalize very small gas flows at high pressure differentials. Heretofore it has been the practice to enclose a conventional wet test meter within a metal case designed to withstand the desired working pressure. This complicates reading of the conventional dial pointers of the meter which is usually done visually through a small glass port in the meter case with the aid of a probe light. A further object of my invention is therefore to provide a meter and indicating apparatus which can be operated at high pressure or low vacuum on very small quantities of gases. An additional object of the invention is to provide a meter reading system whereby the number of rotations or partial rotations can be transmitted to an external counter remote from the rotating element. Still another object of the invention is to provide a telemetering system which can be employed as an accessory to existing meter apparatus. These and other objects of the invention will become apparent as the description of the invention proceeds.

Briefly I attain the objects of my invention by mounting a circular member of uniformly varied paramagnetic properties, e. g., a notched steel disc, on a rotating shaft such as a wet test meter shaft. Such meters conventionally employ a divided drum of known volume and a selected number of notches can be provided for each revolution of the drum and disc. For example, the number of notches in the disc may correspond to the number of divisions on the meter index dial. If desired, the notched disc may be placed behind the usual meter counter mechanism and when so mounted does not interfere with the reading of the meter in the conventional manner.

An armature consisting of two inductance coils on a generally U-shaped pole piece is mounted so that its poles are in an inductive relation to the periphery of the notched disc. The arms of the U-shaped armature are inclined inwardly along radii of the disc and a clearance of about 0.010 inch is allowed between the disc teeth and the poles. The orientation of the armature and the disc is such that one pole is adjacent to one tooth of the disc while the other pole is exactly between two teeth. Thus the span of the poles should be at least one tooth and one notch.

Two armature coils are fixed about the poles and are connected as two arms of an inductance-resistance bridge. The common or central connection of the two coils is grounded, leaving only two electrical connections to be brought out through the case. The bridge is completed with a potentiometer outside the meter case and may be in an amplifier housing. The potentiometer is balanced to give the desired counter response while the meter is in operation. The impulse of alternating polarity, resulting from inductance variations in the bridge circuit as the notched disc revolves adjacent the poles, is fed into a phase-sensitive amplifier. The amplified signals actuate a relay-counter system, the totalized meter reading appearing on the counter dial.

In the drawings, I have illustrated, generally and specifically, systems according to my invention and wherein:

Figure 1 is a vertical section diagrammatically illustrating a wet test meter equipped with a notched disc and a bi-pole armature means;

Figure 2 is a view taken along line 2—2 of Figure 1 and showing details of the armature assembly;

Figure 3 is a schematic block diagram; and

Figure 4 is a detailed circuit diagram.

Referring to the drawings, the wet test gas meter of Figures 1 and 2 includes a meter case 10 within which is journaled meter drum 11 on shaft 12. The gear box 13 includes the gear train on drum shaft 12 and the pointer 14. The inductance varying means is fixed to the shaft 12 within the meter case 10 and as illustrated comprises a notched disc 15 having symmetrically spaced teeth 16. A bifurcated armature means 17, comprising a U-shaped frame or pole piece 18 with spaced poles 19 and 20 and coils 21 and 22 about the poles, is supported by plate 31 within the meter case 10 adjacent the periphery of the disc 15. The plate 31 may be a non-magnetic material such as aluminum. The leads 23 pass through a wall of the meter case 25 via compression fitting 24 which permits the meter to be operated at high or low pressures.

In Figure 1 the meter case 10 is supported within a high pressure casing 25 which comprises a cylindrical section 26 closed at both ends by flange plates 27 and 28. The flange plates or end closures 27 and 28 are held in compression over the ends of the cylinder 26 by suitable means such as tie-rods 37. Adjustable legs 29 attached to the meter case 10 rest on a platform 30 fixed within the cylindrical high pressure casing 25. The flange plate 27 opposite the index pointers 14 of the meter is provided with a sight glass 32.

Water is maintained at a level at least above the shaft 12 and gas flow to be measured is introduced via conduit 33 and upturned gas inlet 34 where the gases displace water from successive segments of the gas-measuring rotor or drum 11, thereby causing the shaft 12 to turn. A second sight glass (not shown) is ordinarily provided for the purpose of viewing a water level gage associated with the wet test meter but for simplicity is not illustrated in the drawing.

The measured gas leaves the meter case 10 by gas outlet 35, discharging to the interior of the high pressure casing 25 or to the atmosphere.

Although in the embodiment illustrated the meter is arranged within a separate high pressure casing 25, it is also contemplated that the meter case 10 itself might be constructed of heavy gage material so as to be useable at high pressure differentials. In that event the compression fitting 24 will be in a wall of the meter case 10. Likewise, the leads 23 from the pick-up 17 in either modification of the apparatus might beneficially be taken through a portion of the casing which is above the liquid level in the meter.

Each revolution of the drum 11 corresponds to a known volume such as, for example, 0.1 cubic foot, and when 50 teeth are employed each tooth 16 corresponds to 1/500 of a cubic foot. Similarly when 100 teeth are evenly spaced around the disc 15, each complete revolution of the drum 11 and hence the disc 15 corresponds to 0.001 cubic foot. Modifications in inductance varying wheel 15 can be made to correspond to wet test meter drums of any capacity.

Upon rotation of the disc 15 the inductance in adjacent arms of the inductance-resistance bridge circuit 38 varies, thereby producing a bridge output of alternating polarity which is fed via leads 23 to a phase-sensitive amplifier 39, one embodiment of which is illustrated in Figure 4.

A potential is applied to the inductance bridge circuit 38 via leads 46 and associated with the bridge circuit 38 is a potentiometer 40 which is adjusted to give the desired counter-response while the meter is in operation. The amplifier signal from amplifier 39 is applied to the relay 41 which controls the counter 42. This general arrangement is illustrated in Figure 3.

In Figure 4 I have illustrated the circuit diagram in some detail including the inductance-resistance bridge 38 together with the phase-sensitive amplifier 39 which controls the relay 41 for actuating the counter 42 which may be of the dial or cylinder types. The bridge circuit includes the variable inductance arms 43 and 44, the center or common connection 45 of the inductance arms 43 and 44 being grounded. Across the arms 43—44 is impressed a constant potential via leads 46 from a source such as step-down transformer 47 providing about 5 volts. The bridge 38 is completed with the potentiometer 40, normally located outside of the meter case 10 or 25 in the amplifier housing and adjusted to give the desired counter-response while the meter is in operation.

The bridge output of reversing polarity, resulting from inductance variations in arms 43 and 44, is fed into the amplifier circuit 39 through the slide wire 48 onto the grid of the triode tube 49 which has the usual cathode and plate. Between the plate and the cathode of this vacuum tube 49 is a coupler consisting of a resistor 50 and a condenser 51 in series, with a resistor 62 and a condenser 63 in parallel. Couplers, including condensers 51a and 51b and resistors 50a and 50b, are provided for each of triodes 52 and 53. The amplified impulse from the resistance-inductance bridge is a positive voltage which raises the voltage level of the output of triode 54 sufficiently to actuate the relay 41.

The anodes of tubes 49, 52 and 53 are connected in parallel to a constant voltage source such for example as provided by step-up transformer 55 and rectifier 56. A resistor 64 is interposed between the transformer 55 and rectifier 56. A heating current for the plates of the vacuum tubes may be provided by means of step-down transformer 55a and may, for example, supply about 6.3 volts. A resistor 57 is in series with each of the anodes, and the anode of each tube is separately grounded through individual condensers 58, 58a and 58b. Between the condensers 58, 58a and 58b, resistors 65 and 66 are interposed. A tap is taken from the coupler across the anode and cathode of tube 53 to the grid of tube 54. Connected to the cathode or plate of tube 54 are a resistance 59 and a condenser 60 in parallel. The anode current from tube 54 actuates the relay 41 which is connected in parallel with a blocking condenser 61 and to one side of the transformer 55.

The components of the circuit diagram in Figure 4 may have the following characteristics:

| | |
|---|---|
| Resistors 50, 50a, 50b, 57, 57a, 57b_ | 1 megohm. |
| Resistor 59 | 300 ohms. |
| Resistor 62 | 10 K. |
| Resistor 64 | 1 K. |
| Resistor 65 | 100 K. |
| Resistor 66 | 50 K. |
| Condensers 51, 51a and 51b | .05 mfd. |
| Condensers 58, 58a, 58b and 61 | 10 mfd. |
| Condensers 60 and 63 | 25 mfd. |
| Coils 21 and 22 | 2500 turns enameled #36 copper wire. |
| Relay 41 | 7 K. |
| Triodes 49 and 52 | 7F7. |
| Triodes 53 and 54 | 7N7. |

The operation of the amplifier circuit is based upon the time relationship between the A. C. supply voltage on the plate of the ouput tube 54 controlling the counter relay 41, and the input voltage introduced via lead 48 from the inductance bridge pick-up 38. The supply voltage may be provided by a step-up transformer 55 and selenium rectifier 56 to produce a pulsating 60-cycle unidirectional potential of about 250 volts. During the time that the input voltage from the bridge pick-up 38 and the voltage on the ouput tube 54 are out of phase, no current will flow through the counter relay 41. When the input voltage is in phase, i. e. of the same polarity as the voltage on the output tube 54, current will flow through the counter relay 41. This condition obtains when the pole 20 is opposite a paramagnetic tooth 16 on the rotating disc 15. Simultaneously, the other pole 19 is opposite a space between adjacent symmetrically arranged teeth on the disc.

As the notched wheel or disc 15 is rotated by the drum shaft 12, a tooth 16 is brought into register with alternate poles 19 and 20.

The arms 43 and 44 function alternately as a resistance and as an inductance, effecting a change in polarity of the impulse on lead 48. Thus, the phase of the inductance bridge output varies from negative to positive. During the time that the impulse voltage is in phase with the supply, current flows to the counter relay 41 to actuate it. The pick-up may therefore be considered as a phase-shifting means responsive to the rotation of the meter drum 11 as the notched disc 15 moves successively past the spaced poles 19 and 20 which, with coils 21 and 22, form adjacent arms 43 and 44 of an inductance-resistance bridge 38.

Although I have described the invention in connection with particular embodiments thereof, it will be understood that modifications both of the circuit arrangement and in the apparatus components employed can be made without departing from the spirit or scope of the invention described above or defined in the appended claims.

I claim:

1. In a wet test meter, the improvement which comprises a rotatable inductance varying means fixed to the drum shaft of said wet test meter, a pair of spaced inductive coil means at the periphery of said rotatable inductance varying means, an inductance-resistance bridge circuit means including said inductive coils in series, the output of said bridge circuit means being of alternating polarity, and an amplifier means connected to the said bridge circuit means and being responsive to output of only one polarity.

2. In a telemetering system including an inductance-bridge means, the improvement which comprises a rotatable inductance varying means, an armature means consisting essentially of a U-shaped pole piece, a pair of inductance coils about the poles of said pole piece, said poles being inclined radially toward the center of rotation of said rotatable inductance varying means and being peripherally spaced from each other whereby inductance varying means is disposed adjacent each pole alternately to produce a cyclically varying inductance change in the said bridge means.

3. An apparatus for electrically transmitting increments of rotation of a rotating member to a remote counter mechanism which comprises a uniformly notched steel disc, an armature means adjacent the periphery of said disc, said armature means comprising a bifurcated pole piece and an inductance coil about each leg of said pole piece, a bridge circuit including said coils and a potentiometer, the output of said potentiometer being of alternating positive and negative phase, phase-sensitive amplifier means in circuit with the said potentiometer, said amplifier means being responsive only to the positive phase of said output and a relay means controlled by the amplified impulse from said amplifier means.

4. In a telemetering system for use in connection with wet test meters having a rotating measuring drum mounted on a drum shaft, the improvement which comprises a notched steel disc fixed to rotate with the drum shaft of the wet test meter, a pair of inductance coils, a U-shaped pole piece supporting said coils, the arms of said pole piece being inclined radially toward said disc and in closely spaced alignment with the periphery thereof, and a bridge circuit means including said inductance coils whereby the polarity of the output of said bridge circuit is alternately reversed by the successive alignment of each notch of said notched steel disc with the arms of said pole piece.

5. In a system for counting increments of revolutions of a rotatable element, the improvement which comprises a plurality of uniformly spaced paramagnetic elements rotated by said member, a U-shaped pole piece, the arms of said pole piece being aligned with radii of said rotatable member and adjacent thereto, a similar coil winding about each of said arms in series, said U-shaped pole piece and coil windings comprising a bi-pole armature means, electrical bridge circuit means including said coils and a potentiometer, a power source applied across remote ends of said windings, an electrical ground between said windings, phase-sensitive means for amplifying the output of said bridge circuit, said phase-sensitive means being sensitive only to positive phase output, relay means energized by the amplified output, and a counter actuated by said relay.

6. In a wet test meter including a meter case, a meter drum within said case and a drum shaft rotatably supporting said drum within said case, the improvement which comprises a paramagnetic disc supported by said shaft within said case, a plurality of uniformly spaced notches at the periphery of said disc, armature means within said case adjacent the periphery of said disc, said armature means including a pair of spaced inductance coils in series and associated poles, electrical leads from said coils through said case connected in a circuit with a potentiometer exterior of said case, an amplifying means in circuit with the said potentiometer, said amplifier means being sensitive only to the positive phase portion of the output of said potentiometer, a relay means energized by the signal from said amplifier means, and a counter mechanism actuated by said relay means, said relay and counter being located remote from said wet test meter.

7. In a telemetering system for use with a wet test meter having a rotating measuring drum mounted on a drum shaft, the improvement which comprises rotatable disc means fixed on such drum shaft, at least two magnetic pick-up stations comprising a rotated component and a stationary component, said rotated component including a plurality of symmetrical arranged means on said rotatable disc means adapted to actuate said stations sequentially, electrical circuit means controlled by said pick-up stations, a pulse polarity-responsive selector means in said circuit means, relay means actuated only by the discontinuous pulse of selected polarity passed by said circuit means, and counter means controlled by said relay means.

8. The system of claim 7 wherein the rotated component is a paramagnetic element on said disc and said stationary component includes an electromagnetic pole piece.

9. The system of claim 8 wherein the said pole piece comprises coil means in an electrical bridge circuit controlling the relay means actuating the counter means.

10. A pulse transmitter comprising in combination a pulse generating means, said means including a rotatable inductance-varying means, an armature means adjacent the periphery of said rotatable inductance-varying means connected in an inductance bridge, an amplifier connected to the output of said bridge, the bridge circuit including variable inductance arms with a ground between said inductance arms, a constant potential source applied across the ends of said arms, a variable potentiometer connected across said ends of said arms, said amplifier circuit including a first triode tube, a coupler consisting of a resistor and a condenser in series between the plate and cathode of said first triode tube, a second triode tube and a third triode tube in series with the first triode tube couplers including condenser and resistor in series associated with each of said second and third triode tubes, a fourth triode tube provided with a resistor and condenser in parallel, the amplified impulse from the inductance bridge comprising a positive voltage which raises the voltage level of the output of the fourth triode sufficiently to actuate a relay.

References Cited in the file of this patent

UNITED STATES PATENTS

| | | |
|---|---|---|
| 1,770,804 | Price | July 15, 1930 |
| 1,886,336 | Gunn | Nov. 1, 1932 |
| 2,086,444 | Shotter | July 6, 1937 |
| 2,400,564 | McNamee | May 21, 1946 |

FOREIGN PATENTS

| | | |
|---|---|---|
| 186,989 | Great Britain | Oct. 9, 1922 |
| 548,742 | Great Britain | Oct. 22, 1942 |